US011991307B2

(12) United States Patent
Förster

(10) Patent No.: US 11,991,307 B2
(45) Date of Patent: May 21, 2024

(54) COMMUNICATION METHOD AND COMMUNICATION SYSTEM

(71) Applicant: SCHWEIZERISCHE BUNDESBAHNEN SBB, Bern (CH)

(72) Inventor: Markus Förster, Biel-Benken (CH)

(73) Assignee: SCHWEIZERISCHE BUNDESBAHNEN SBB, Bern (CH)

( * ) Notice: Subject to any disclaimer, the term of this patent is extended or adjusted under 35 U.S.C. 154(b) by 198 days.

(21) Appl. No.: 16/962,138

(22) PCT Filed: Dec. 4, 2018

(86) PCT No.: PCT/EP2018/083524
§ 371 (c)(1),
(2) Date: Jul. 14, 2020

(87) PCT Pub. No.: WO2019/149407
PCT Pub. Date: Aug. 8, 2019

(65) Prior Publication Data
US 2020/0412882 A1    Dec. 31, 2020

(30) Foreign Application Priority Data
Feb. 5, 2018   (EP) .................................... 18155030

(51) Int. Cl.
*H04M 15/00*    (2024.01)
*H04L 67/12*    (2022.01)
(52) U.S. Cl.
CPC ........ *H04M 15/8083* (2013.01); *H04L 67/12* (2013.01); *H04M 15/09* (2013.01); *H04M 15/51* (2013.01); *H04M 15/8033* (2013.01)
(58) Field of Classification Search
CPC ... H04W 4/24; H04W 76/12; H04W 28/0268; H04W 4/80; H04W 84/12; H04W 24/04;
(Continued)

(56) References Cited

U.S. PATENT DOCUMENTS 9,491,606 B2 * 11/2016 Cho ................... H04L 12/1407
2004/0258031 A1 * 12/2004 Zabawskyj ....... H04M 15/8214
370/328
(Continued)

FOREIGN PATENT DOCUMENTS

EP    1 263 164 B1    6/2006
EP    1 862 593 A2   12/2007
(Continued)

OTHER PUBLICATIONS

"Fact Sheet GSM;" Federal Office for Communication BAKOM; Jun. 2015; Bern, Switzerland.
(Continued)

*Primary Examiner* — Nizar N Sivji
*Assistant Examiner* — Jing Gao
(74) *Attorney, Agent, or Firm* — Oliff PLC

(57) ABSTRACT

A communication method for at least one mobile terminal of a user, suitable for setting up data connections or call connections via at least one mobile communication network to a data terminal or to a voice terminal and suitable for the wireless communication with a host server. Thereby a) a wireless communication link is established between the host server and the mobile terminal; b) a voucher is created by the host server; c) the voucher is transmitted to the operator of the mobile communication network or to a service provider; and d) the operator of the mobile communication network or the service provider, on the basis of the voucher, debits communication costs for data connections or call connections of the mobile terminal that were registered during the time period indicated in the voucher, at least in part to an account assigned to the identifier of the host server.

19 Claims, 7 Drawing Sheets

Figure 1:
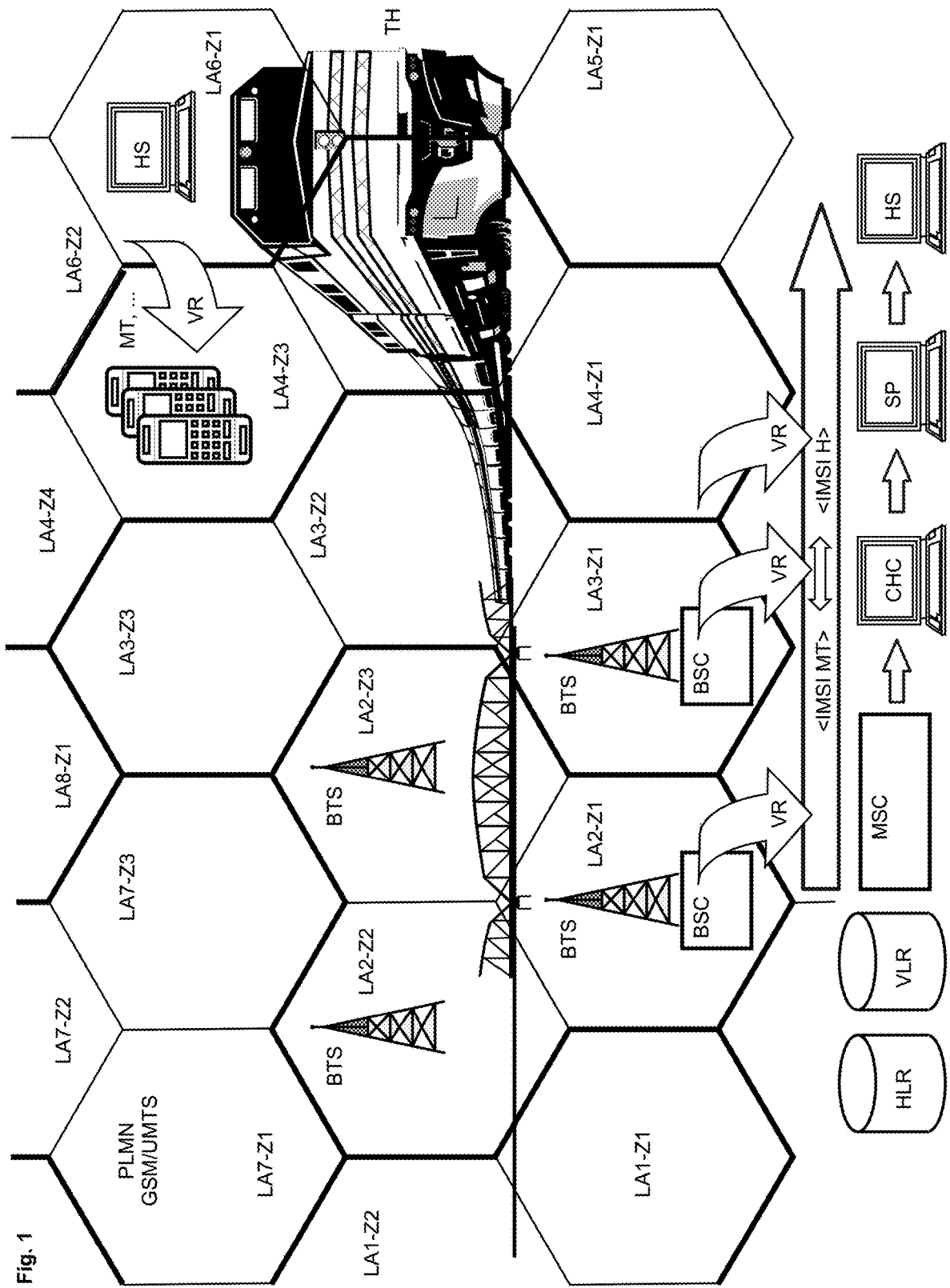

(58) Field of Classification Search
CPC ......... H04W 36/0016; H04W 36/0033; H04W 36/165; H04W 4/70; H04W 76/27; H04W 12/06; H04W 12/08; H04W 28/24; H04W 36/18; H04W 4/029; H04W 52/40; H04W 84/18; H04W 88/08; H04W 88/16; H04W 8/24; H04W 12/12; H04W 28/0215; H04W 48/18; H04W 60/00; H04W 72/048; H04W 76/10; H04W 76/16; H04W 76/36; H04W 84/042; H04W 88/06; H04W 12/00; H04W 12/03; H04W 12/04; H04W 12/72; H04W 24/02; H04W 24/08; H04W 28/0236; H04W 28/26; H04W 36/0022; H04W 48/02; H04W 48/08; H04W 48/14; H04W 48/16; H04W 48/20; H04W 4/02; H04W 4/025; H04W 76/11; H04W 76/18; H04W 76/19; H04W 76/30; H04W 76/34; H04W 88/02; H04W 88/18; H04W 8/18; H04L 67/2809; H04L 67/28; H04L 12/14; H04L 12/1407; H04L 1/00; H04L 67/10; H04L 65/1063; H04L 67/34; H04L 47/805; H04L 63/0428; H04L 63/08; H04L 67/22; H04L 67/306; H04L 12/189; H04L 27/0014; H04L 63/0435; H04L 63/061; H04L 63/0823; H04L 63/083; H04L 63/0876; H04L 63/0892; H04L 63/20; H04L 65/40; H04L 65/602; H04L 67/14; H04L 9/3247; H04M 15/00; H04M 15/66; H04M 15/61; H04M 15/41; H04M 15/58; H04M 15/62; H04M 15/72; H04M 15/80; H04M 15/852; H04M 15/854; H04M 15/09; H04M 15/28; H04M 15/46; H04M 15/51; H04M 15/59; H04M 15/723; H04M 15/77; H04M 15/771; H04M 15/772; H04M 15/8016; H04M 15/8038; H04M 15/8044; H04M 15/8055; H04M 15/8083; H04M 15/8214; H04M 15/8228; H04M 15/851; H04M 15/853; H04M 15/888; H04M 17/206; H04M 17/207; H04M 17/301; H04M 17/307; H04M 1/0202; H04M 1/724; H04M 1/72457; H04M 2215/0188; H04M 3/00; H04M 3/5191

See application file for complete search history.

(56) References Cited

U.S. PATENT DOCUMENTS

| | | | | |
|---|---|---|---|---|
| 2008/0214175 | A1* | 9/2008 | Papadoglou | H04W 88/16 455/422.1 |
| 2008/0280624 | A1* | 11/2008 | Wrappe | G01S 5/0036 455/456.1 |
| 2013/0262198 | A1* | 10/2013 | Chung | H04W 4/02 705/14.1 |

FOREIGN PATENT DOCUMENTS

| | | |
|---|---|---|
| EP | 2 023 674 A1 | 2/2009 |
| EP | 2 631 152 A1 | 8/2013 |
| WO | 2015/041580 A1 | 3/2015 |

OTHER PUBLICATIONS

"Fact sheet WLAN;" Federal Office for Communication BAKOM; Mar. 2017; Bern, Switzerland.

Mouly et al.; "The GSM System for Mobile Communications;" Cell & Sys Verlag; 1992; Chapters 1.3.1.7 and 9.1.2; pp. 71 and 572 to 577.

Public-Key-Infrastruktur; Wikipedia; https://de.wikipedia.org/wiki/Public-Key-Infrastruktur.

Walke; "Mobilfunknetze and ihre Protokolle 1;" B.G. Teubner Verlag; Stuttgart 2001; Chapters 3.11, 3.12, 3.13, 3.16, and 3.17; pp. 294 to 325, 339 to 341.

Jan. 25, 2019 Search Report issued in International Patent Application No. PCT/EP2018/083524.

Jan. 25, 2019 Written Opinion of the International Searching Authority issued in International Patent Application No. PCT/EP2018/083524.

* cited by examiner

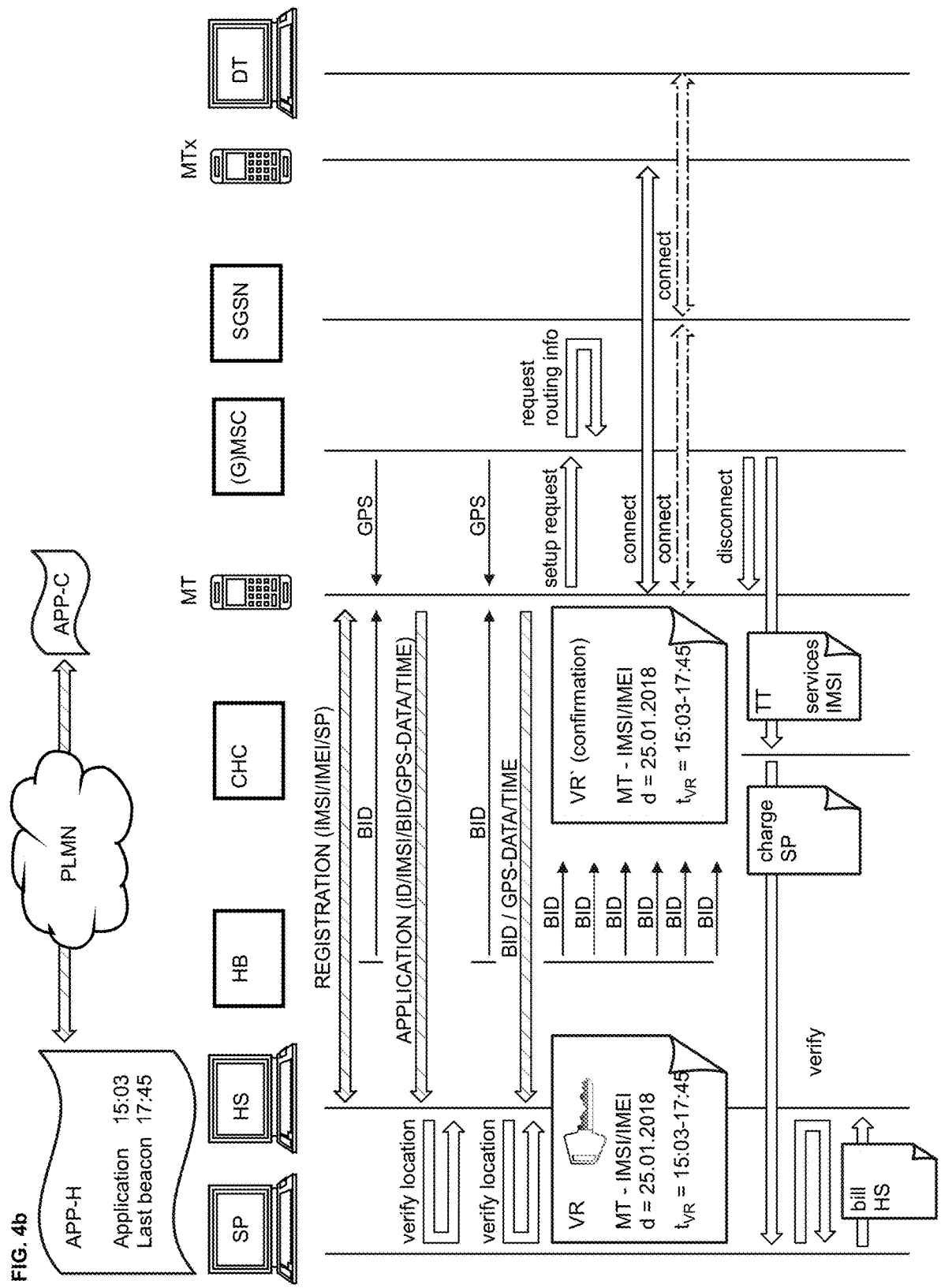

COMMUNICATION METHOD AND COMMUNICATION SYSTEM

The invention relates to a communication method and a communication system, with which communication services are provided to users of mobile terminals.

Modern communication networks allow subscribers or users to establish call connections or data connections from their mobile terminals at any location via a mobile radio network, e.g. mobile radio networks operating according to the GSM standard or extended standards relating thereto, to other terminals which are directly or indirectly connected to the mobile radio network.

According to the fact sheet GSM, Federal Office for Communication BAKOM, June 2015, Bern, the GSM system was originally designed for mobile voice telephony services. Later, the GSM standard was extended with new functionalities such as HSCSD (High Speed Circuit Switched Data), GPRS (General Packet Radio Service) and EDGE (Enhanced Data rates for GSM Evolution) or LTE (Long Term Evolution).

EP2023674A1 describes procedures for the mobility management of mobile terminals in a mobile radio network, by which handover problems with mobile terminals carried in a vehicle can be avoided. Mobile terminals can therefore be used efficiently in large numbers in vehicles without the risk of disturbances. EP2631152A1 describes a method for locating mobile terminals in a mobile radio network and for managing the rolling stock in a railway network.

In public buildings or places, mobile terminals can often be connected to the Internet via wireless networks (WLAN Wireless Local Area Networks) free of charge.

Fact sheet WLAN, Federal Office for Communication BAKOM, March 2017, Bern, describes WLAN technologies and standards. Typically, the IEEE 802.11 standard is used. For short distances and the setup of ad-hoc networks, the Bluetooth standard IEEE 802.15.1 is also regularly implemented.

In public buildings and vehicles, visitors, guests and customers are often granted free access to communication services by a host. The term "host" includes, for example, governmental organizations, operators of public transport systems, owners of commercial buildings, restaurants, sports facilities or office complexes, etc.

The operation of such WLAN networks has advantages and disadvantages for operators and users. Low-cost WLAN technologies and low-cost Internet access are available for operators. After receipt of a password, the user can use the WLAN offer free of charge.

The disadvantage is that the operator or provider of communication services must ensure that the user has access to the WLAN during the entire duration of the user's stay and in the entire lounge. In large rooms or room facilities and building complexes, especially in railway trains, the operator must therefore carry out correspondingly complex installations and maintenance work. From the user's point of view, this often does not result in the connection quality he is used to from his own service provider. The data transmission rate may be too low or the network coverage may be insufficient. The data transfer rate typically decreases with the number of mobile terminals connected to the WLAN.

The user therefore has to rely on the solution of the operator or host, which is usually optimized in terms of cost and not in terms of quality. The occurrence of technical problems is unsatisfactory on both sides. The host must expect to receive error messages and complaints which affect the overall package of services. The user who requires communication services may not be able to carry out his work and business transactions efficiently.

The present invention therefore is therefore based on the object of creating an improved communication method and an improved communication system.

The communication method and the communication system shall allow a host to grant guests or users with a mobile terminal free or discounted access to communication services without the disadvantages mentioned above. During the operation of the communication systems the host shall not be confronted with technical questions and error messages. Users should be able to use communications services without restriction in the quality they are accustomed to and regardless of the number of other active mobile terminals. During the operation of the communication systems the host should not be confronted with technical inquiries and error messages.

The inventive communication system shall have a simple construction and shall be implemented with little effort. Complex installations shall be avoided. Furthermore, improvements shall be proposed which can advantageously be taken into account in the revision of public communication systems and their protocols.

This task is solved with a communication method and a communication system, which have the features specified in claims 1 and 13. Advantageous embodiments of the invention are indicated in further claims.

The communication method is provided for at least one mobile terminal of a user, which is suitable for setting up data connections or call connections via at least one mobile communication network to a data terminal or to a voice terminal and which is suitable for the wireless communication with a host server of a host. Although the use of the inventive communication system is explained below using one mobile terminal as an example, the communication system can be used by any number of mobile terminals of different types, such as smart phones, tablets, notebooks, etc.

For example, mobile terminals of passengers on a railway train, mobile terminals of visitors to a restaurant, a trade fair, an office building, a sports event or a public building can use the inventive communication system without restrictions.

According to the invention, a) a wireless communication link is established between the host server and the mobile terminal, via which identification data are transferred from the mobile terminal to the host server;

b) a voucher is created by the host server, in which at least the identification data and a time period and preferably an identifier of the host server are registered;

c) the voucher is transmitted to the operator of the mobile communication network or to a service provider, which prepares the statement of charges for the mobile terminal; and d) the operator of the mobile communication network or the service provider, on the basis of the voucher, debits communication costs for data connections or call connections of the mobile terminal that were registered during the time period indicated in the voucher, at least in part to an account assigned to the identifier of the host server.

The inventive communication system thus allows a host to provide any users of mobile terminals, e.g. guests, especially passengers, business partners, customers, staff or visitors, access to communication services free of charge or at reduced costs. The communication costs are fully or partly borne by the host, who negotiates favourable conditions with the service providers.

The users can continue to use the communication services of their providers, while the costs are borne by the host. In the various configurations of the invention, the hardware costs for the host are low. In particularly advantageous embodiments of the invention, the installation of wireless networks can be dispensed with completely. Instead, radio beacons are installed, which only send out an identifier, but do not communicate bi-directionally with the mobile terminals. The host can therefore install the required number of radio beacons at minimum cost in his building, area or means of transport, after which no further hardware expenses are required.

The users can log on to the host with little effort and can then communicate as usual via their mobile terminal, while the costs are charged to the host. The login with transmission of the identification data is initialized by the user or preferably automatically, so that no effort is required from the user. Only the one-time installation of an application or application (software app) is required, which exchanges data with an application installed in the host server. The short communication between the application in the mobile terminal and the application in the host server can take place via any wireless communication network, WLAN or the public mobile radio network.

The user can download the application e.g. via the mobile radio network from the internet pages of the host and install it on his mobile terminal. He can then communicate with the host server via the installed application. Preferably the user registers with the host at the first contact and transfers his identification data, such as the IMSI, to the host. In the later use of the communication services, the host has control over the users who benefit from its offer. This process is particularly easy if the user is already using another application or application of the host and has already entered his identification data for it.

The invention, which can be realized in various advantageous embodiments, has numerous other advantages.

By implementing the application provided by the host in the mobile terminal, an extended data exchange between the host and the user can take place, which can be used for the secure creation of the voucher or for other purposes.

The host can present current offers and information on the application. Passengers on a train can be provided with current travel information, such as expected delays, or offers, e.g. offers of the dining car or offers from service providers at the destination. In a department store, special actions can be transmitted to the applications. In a sports arena, current sports results and background information on transport possibilities can be communicated after the end of the event.

Interactions between the host and the user can be encouraged, resulting in stronger customer loyalty. For example, the applications can be used to register purchases that can be taken into account in the allocation of the voucher or in the calculation of the time period, while the mobile terminals can be used free of charge. The operator of a transport network can allocate extended vouchers to regular users of transport services.

The applications installed in the mobile terminals according to the invention can exchange data advantageously with other applications which are used for the issue of the voucher or which provide the user with an additional benefit. In preferred embodiments the electronic ticketing is coupled with the applications installed in the mobile terminals according to the invention. This means that a voucher is only issued to a passenger or his/her mobile terminal after the host server has checked the passenger's entitlement to a ride. Passengers are therefore motivated to have their travel entitlement checked electronically during the journey in order to gain free access to the communication services. The presentation of electronic tickets is therefore no longer an obligation but a desirable process. This will facilitate the checking process by the railway operator.

Preferably, the applications implemented in the mobile terminals can also access parameters in the mobile terminals that can be used to establish a connection with the mobile radio network. For example, the required connection quality (QoS) can be set to a value specified by the host. In this way, the host can limit its costs.

Preferably a repeated interrogation of the identification data takes place, preferably at the beginning and at the end of the time period, during which access to communication services is provided free of charge. This interrogation or check can be advantageous when entering and leaving a space assigned to the host server, e.g. when entering a railway train and after reaching the destination when leaving the railway train. When using radio beacons, their identification can be periodically transmitted to the host server. The identification of the radio beacons can also be switched in a way known to the host server, so that a different identification can be transmitted to the host server for each interrogation. In this way it is ensured that the user actually uses the services of the host and/or is present in the service area of the host during the time period in which he/she receives free access to communication services.

The time period during which free access to communications services is granted can thus advantageously be defined according to the time period between the login of the mobile terminal, preferably upon entering the room assigned to the host server, and the logout of the mobile terminal, preferably upon leaving the room assigned to the host server.

Alternatively, the time period during which access to communications services is provided free of charge can be defined according to the time period of a service used by the user. This time period can, for example, be taken from an electronic calendar or a set of regulations regarding the opening hours of a building. If visitors of a hotel have reserved a stay for a few days, this time period for access to the communication services can be taken over accordingly. The host server of a transport company, of a bus company or of a railway company, can take the time period from an electronic timetable or retrieve it from a timetable computer, which takes delays into account if necessary.

The time period can also be defined taking into account presence times stored for the user of the mobile terminal. An employer can assume the communication costs for the time period of the working times of the employee.

The communication system comprises the host server and the registered mobile terminals, which can access a mobile radio network. A host server can cover all needs of a host. Larger companies with several locations or transport companies with vehicles preferably use at least one host server at each location and in each vehicle, which communicates with a central host server. The central host server can control, monitor and secure the coordination of the voucher issuance. The issued vouchers or corresponding reports can be transmitted from the host servers directly or via the central host server to the service provider. It should be noted that different service providers are usually assigned to the mobile terminals. The host will conclude contracts with the service providers and negotiate favourable rates in view of the high traffic volume.

Preferably, the central host server transmits lists of reference numbers to the host server and the service provider or the network operator at short time intervals. These lists are individually assigned to the vouchers when the voucher is issued and checked by the service provider or the network operator when the voucher is billed. In this way the communication system can be secured. If, for example, the host server is stolen, no new reference numbers are sent to it and the assigned reference numbers are declared invalid. Vouchers with invalid reference numbers that arrive at a service provider may however be used to identify the persons who have stolen the host server.

Likewise, the host server, or if necessary the central host server, can monitor the radio beacons. If a radio beacon is stolen, its identification is declared invalid.

Processing the vouchers by the service provider or the network operator can be carried out with relatively simple measures. The only prerequisite is that the service provider or the network operator integrates the inventive process flow into his process flows, in particular into the billing process. Basically, an exchange of the billing address is necessary. In addition, checks can be carried out and confirmations sent.

Billing and accounting in the GSM mobile radio network are described in [4], Michel Mouly, Marie-Bernadette Pautet, The GSM System for Mobile Communications, Cell & Sys Verlag, 1992, Chapter 9.1.2, pages 572 to 577. There it is described that the International Mobile Subscriber Identity (IMSI) is the basis for the billing of communication services.

Charging information is collected in the home network of the user in a charging center and delivered to the service provider, which has a billing center that charges the communication costs to the subscriber or user.

By transmission of the voucher the service provider or the network operator is authorized by the host to change the billing address, so that at least in the billing processes the identifier, e.g. the IMSI of the user is replaced by an identifier or IMSI of the host.

Therefore the service provider or the network operator needs the voucher and a confirmation from the host, which confirms the validity of the voucher. The voucher itself can contain a confirmation of the host, so that the host cannot reject the voucher later. Preferably vouchers are signed or encoded with the private key of the host and decoded by the service provider using the public key. By using the public key infrastructure, the procedure can be secured in a simple way (see [6], EP1263164B1, or https://de.wikipedia.org/wiki/Public-Key-Infrastruktur).

The voucher can be transmitted by the host directly or via the beneficiary user or via his mobile terminal to the service provider or to the network operator. Since a confirmation of the host or an appropriately secured voucher is required and the time period of the free access to the communication services is fixed, the voucher is preferably sent by the host directly to the service provider or the network operator. Since the communication costs are usually charged by a service provider, the processing of the voucher can be done most easily directly by the service provider. This process can be handled between the host and the service provider according to a simple protocol, which defines the type and content of the communication between the host and the service provider and is independent of the protocols of the network. It is also possible that different service providers use different protocols for this purpose.

If the voucher is processed within the mobile radio network, a peripheral intervention in the charging center is the easiest option. Again, the direct transfer of the voucher by the host is preferred. The transfer of the voucher by the user or the mobile terminal can be regulated by extensions of the protocol of the mobile radio network. E.g., the handover or verification of the voucher can be done at the registration of the mobile terminal in the mobile radio network. In [4], Chapter 1.3.1.7, page 71, Security Functions, it is described that an authentication of the user takes place to prevent access by unregistered third parties. Within the scope of an extended authentication, the voucher can be presented, which is subsequently checked. From the point of view of the network operator, this can be done without risk, as he can contractually exclude liability for invalid vouchers. Once a voucher is accepted, the identifier of the host can be used instead of the identifier of the user in the processes of the networks for the billing and accounting.

Figure 2A:
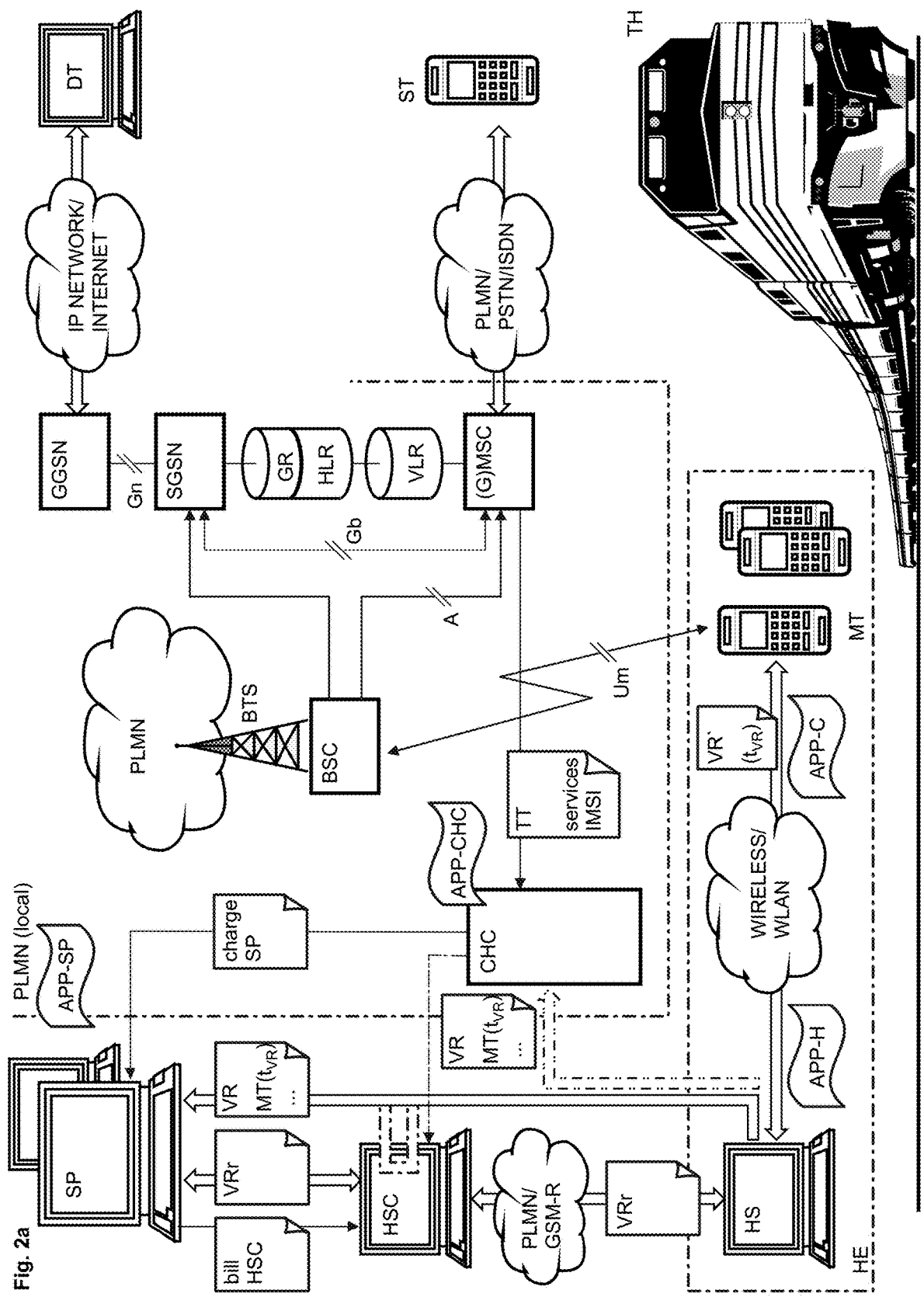
Figure 2B:
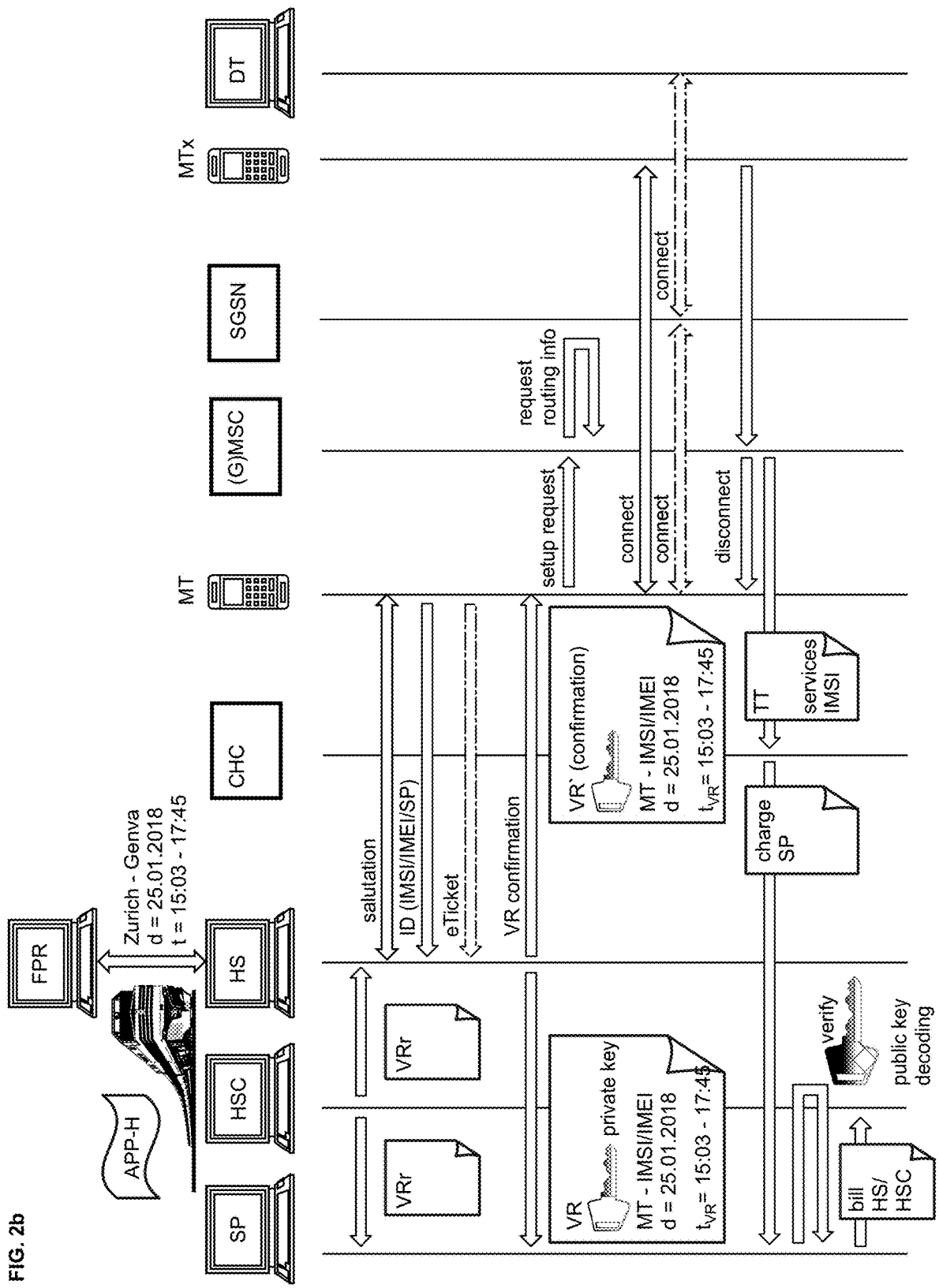
Figure 3A:
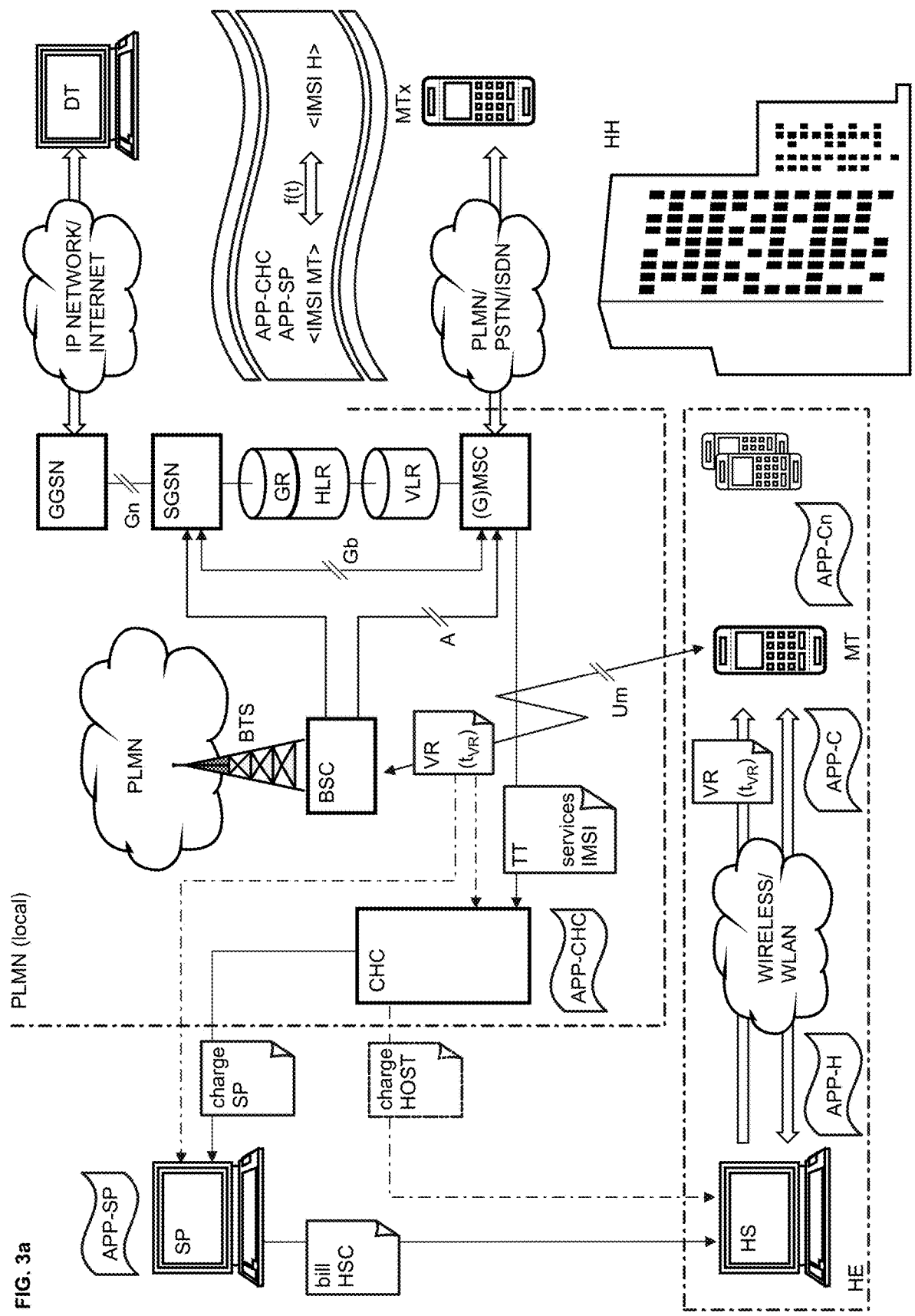
Figure 3B:
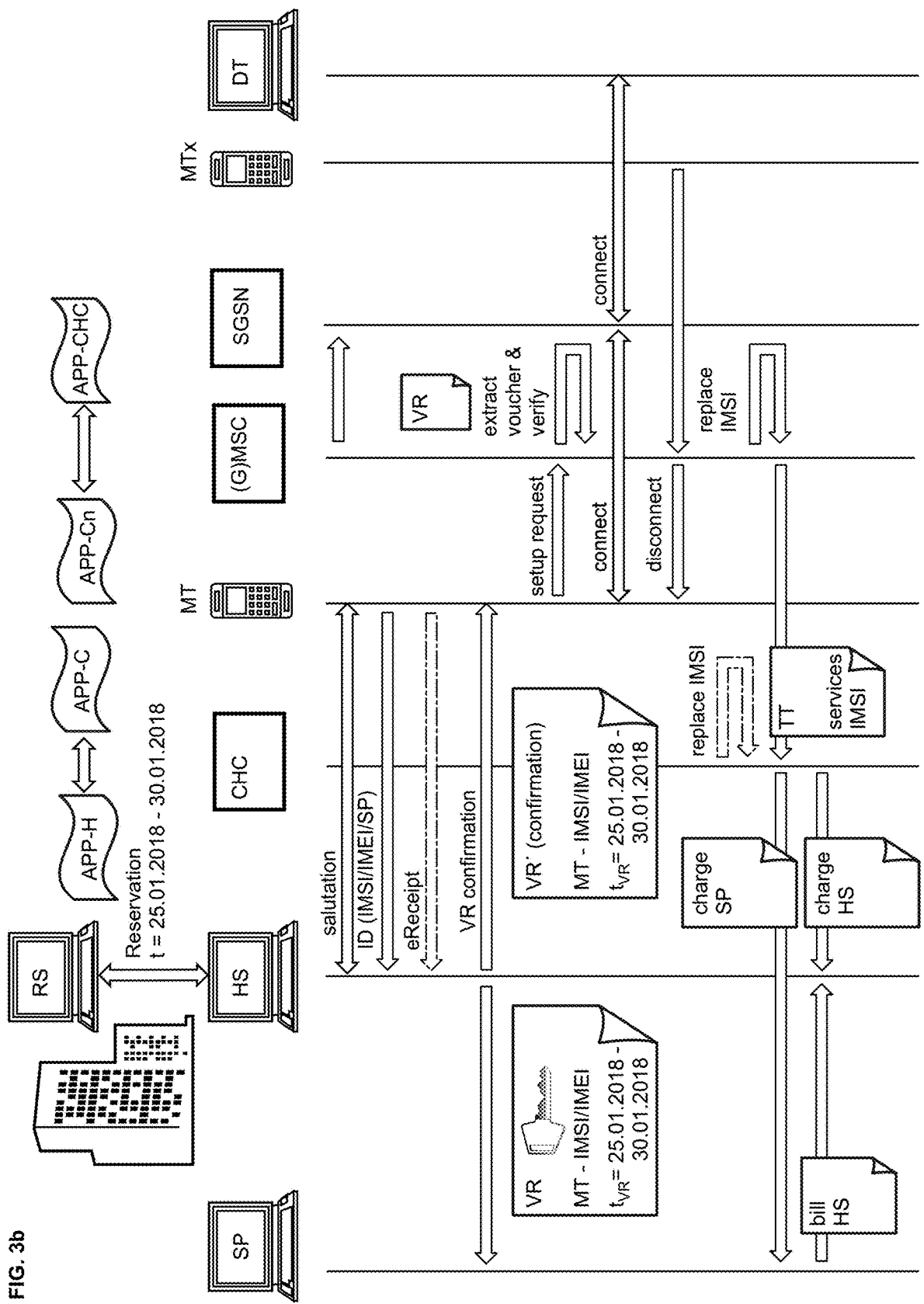
Figure 4A:
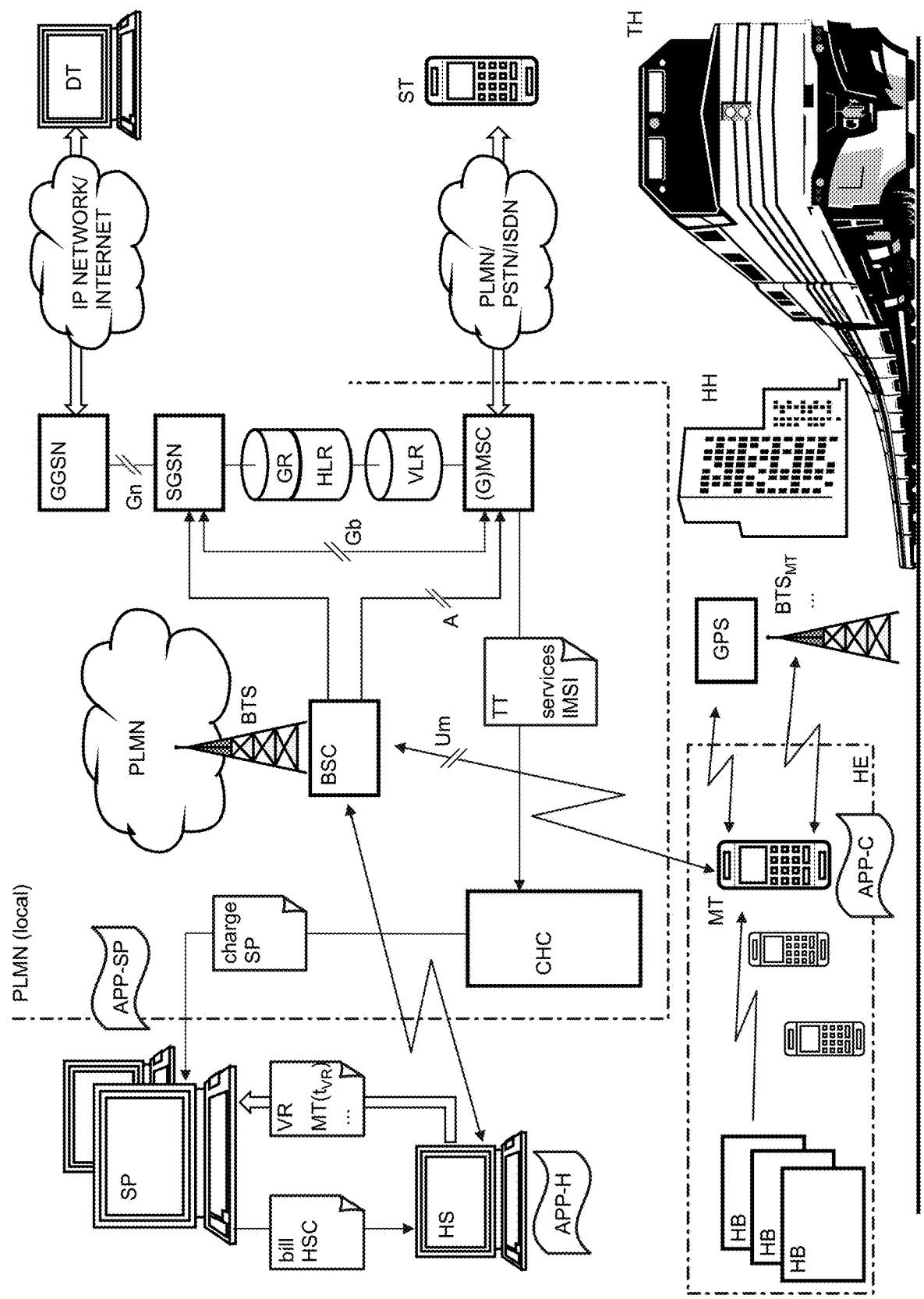

Below, the invention is explained in more detail with reference to the drawings. Thereby shows:

FIG. 1 an inventive communication system with a cellular mobile radio network PLMN covering a geographical area in which a train TH runs with passengers using mobile terminals MT, for each of which a voucher VR is provided by a host server HS of the railway operator, which is taken into account by the network operator or the service provider when charging the communication costs;

FIG. 2a a communication system e.g. according to FIG. 1, within which vouchers VR are transmitted from the host server HS directly to the service provider SP, if necessary to a charging center CHC of the network operator;

FIG. 2b the procedure for the issuance of a voucher VR and for charging the communication costs for communication services used by a mobile terminal MT in the communication system shown in FIG. 2a;

FIG. 3a an inventive communication system located in a building HH, within which vouchers VR are transmitted from the host server HS to the mobile terminals MT and from there to the service provider SP or to the charging center CHC of the network operator;

FIG. 3b the procedure for the issuance of a voucher VR and for charging the communication costs for communication services used by a mobile terminal MT in the communication system shown in FIG. 3a;

FIG. 4a a communication system e.g. as shown in one of the figures above, in which radio beacons HB are provided, by means of which the location of the mobile terminals MT, which log on to the host server HS, can be determined; and FIG. 4b the procedure for the issuance of a voucher VR and for charging the communication costs for communication services used by a mobile terminal MT in the communication system shown in FIG. 4a.

FIG. 1 shows a section of an inventive cellular mobile radio network PLMN with several location areas $LA1, \ldots, LA8, \ldots$, each having at least one cell $LA_X$-$Z_Y$. Within the section shown, several traffic routes, in particular a railway line, are running on which a railway train TH with numerous passengers is running. FIG. 1 also shows individual units of the mobile radio network PLMN, namely a mobile switching center MSC, a home location register HLR, a visitor location register VLR, transmitting and receiving stations BTS and associated control units BSC, and a charging center CHC.

Charging information or so-called toll tickets for delivered communication services are collected in the charging center CHC and charged to the relevant service provider SP, which has a billing center that normally charges the communication costs to the subscriber or user (see [4], page 575).

FIG. 1 shows further that the railway operator uses at least one host server HS within the railway train TH, which communicates wirelessly with the mobile terminals MT of the passengers and provides them with vouchers VR, which allow the mobile terminals MT to use communication services free of charge. These voucher VR are transmitted directly from the host server HS or indirectly via the mobile terminals MT to an instance of the mobile network PLMN, preferably the charging center CHC, or to the service provider SP. The costs registered for the passenger or user and assigned e.g. to his International Mobile Subscriber Identity (IMSI) are subsequently charged to the railway operator or host and preferably recorded in a central host server HSC.

For the host server HS the localization of the mobile terminals MS is of special importance. This localization can result automatically from the configuration of the communication systems. If the host server is integrated into a local network and exchanges data with a mobile terminal MT, the mobile terminal is necessarily in the area of the local network. However, if the host server HS exchanges data with the mobile terminal MT via the mobile radio network, measures are preferably taken to determine the location of the mobile terminal MT. For this purpose, the communication system of FIG. 4a uses radio beacons which periodically transmit an identifier which is received by the mobile terminals MT and which allows the host server HS to assign the location of the mobile terminal MT to the respective radio beacon. The host server HS and the mobile terminals MT can therefore be located at different locations.

FIG. 1 illustrates that processing of the voucher VR can take place at different locations within the entire process chain by replacing the IMSI of the user, which is usually used for accounting purposes, with an identifier of the railway operator. Subsequently, the accrued communication costs are charged to the railway operator using this identifier. The identifier of the railway operator can also be an International Mobile Subscriber Identity IMSI (IMSI-H), which is treated in the same way as any other IMSI within the process chain. The change can therefore be implemented in the communication system with minimal effort. The transmission of the voucher can be done in different ways and via different media.

The procedure for the issuance and use of a voucher comprises four basic steps (see also FIG. 2b, FIG. 3b or FIG. 4b):

a) A wireless communication link is established between the host server HS and a mobile terminal MT, via which identification data ID are transmitted from the mobile terminal MT to the host server HS.

b) After evaluation and/or verification of the identification data ID, the host server HS creates a voucher VR in which at least the identification data ID of the mobile terminal MT and a time period $t_{VR}$, which determines the validity of the voucher VR, are registered. Preferably the identifier of the host server HS is also recorded.

c) The created voucher VR will be transmitted directly or indirectly to the operator of the mobile communication network PLMN or to the service provider SP, which creates the statement of charges for the mobile terminal MT.

d) Finally, the operator of the mobile communication network PLMN or the service provider SP charges the costs for data connections or call connections of the mobile terminal MT, which were registered during the time period $t_{VR}$ indicated in the voucher VR, at least partially to an account assigned to the identifier of the host server HS.

This procedure is explained in detail below with reference to different examples.

FIG. 2a shows in a first preferred embodiment the communication system of FIG. 1, within which voucher VR is transmitted from the host server HS directly to the service provider SP, possibly to a charging center CHC of the network operator.

FIG. 2a shows the mobile radio network PLM with an EDGE architecture described in [5], Bernhard Walke, Mobilfunknetze and ihre Protokolle, Band 1, B. G. Teubner Verlag, Stuttgart 2000, chapter 3.17, pages 339 to 341. The EDGE (Enhanced Data Rates for GSM Evolution) architecture largely corresponds to the GPRS architecture, but uses a different modulation scheme to achieve higher data rates. The GSM packet data service GPRS (General Packet Radio Service) is described in [5], pages 294 to 321. Network transition functions are described in the following pages 322 to 325. Interfaces and reference points in GPRS are described in [5], page 304. The well-known GSM network architecture (see above) is extended by three network elements for packet data service. The Gateway GPRS Support Node (GGSN) serves as interface to external networks (IP network/Internet). The Serving GPRS Support Node (SGSN) is used for functional support of the mobile terminals MT. All GPRS-related data is stored in the GPRS register GR, which is a subset of the GSM-HLR. Via the radio interface Um the mobile terminals MT have access to the mobile radio network. The actual data traffic in GPRS is handled via the SGSN, the MSC is only used for signalling.

The inventive communication system additionally comprises the host server HS as well as software applications, an application or application APP-H implemented in the host server HS and an application APP-C installed in the mobile terminals MT. To receive and use the voucher VR, an application APP-SP is implemented at the service provider SP, preferably in the billing center. If the voucher VR is received by the network operator and used e.g. in the charging center CHC, an application APP-CHC is provided there.

The MT mobile terminals can be used by passengers on the train TH or in a restaurant at a station. The user's lounge can therefore be mobile or stationary. The (stationary or mobile) host server HS is therefore located in a room unit HE of the host or railway operator. Mobile terminals MT located within the room unit HE can contact and communicate wireless with the host server HS via the applications APP-C and APP-H, e.g. via a WLAN or Bluetooth.

At the beginning it was mentioned that procedures for locating a mobile terminal in a mobile radio network are known from the EP2631152A1.

It is well known that railway operators already provide applications or applications for mobile terminals MT, which can be used to retrieve timetables and purchase tickets. The inventive application APP-C is therefore preferably an additional module of such a known application. For the purchase of a ticket the user is already registered with the railway operator. Identification data of the user are therefore registered in the home location register HLR of the mobile radio network PLMN and in the database of the railway operator. For the following examples, the identity registered in the home location register HLR, namely the IMSI, is preferably used. Alternatively the identity registered with the railway operator could be used.

The host server HS can be mobile or stationary as well as central or decentralized. In addition, several host servers can be provided for example in a building or a railway train, which work individually according to the inventive procedure.

The host server can be integrated e.g. in control devices, with which the train crew checks the tickets. When checking the tickets, the identification data can be read from the mobile terminals and the vouchers can be created. With the ticket control, the allocation of free use of communication services can take place simultaneously. This offers special advantages for the railway operator and the passengers without additional effort.

During the communication between the host server HS and the mobile terminal MT a valid identity is retrieved and included in a voucher VR. Additionally a time period $t_{VR}$ is determined within which the voucher VR is valid. Methods for determining this time period $t_{VR}$ are described above.

In the embodiment described above, the HS host server is aware that the MT mobile terminals are located inside a railway carriage and are therefore entitled to receive free communication services. If the location of the mobile terminals MT is not known to the host server, which may be located in a decentralised manner, it is determined, for example, according to the procedure described below. The localisation within the mobile radio network is also possible, if it is sufficiently accurate.

The created voucher VR or a list of created vouchers VR is preferably signed by the railway operator using the private key of the Public Key Infrastructure (see FIG. 2b). By decoding the voucher VR using the private key, the service provider SP or the charging center CHC can subsequently determine whether the voucher VR are valid.

In this example, the voucher VR is transmitted either to the charging center CHC of the mobile radio network PLMN or preferably to the Billing Center of the service providers SP. A confirmation copy of the voucher VR is transmitted to the mobile terminal MT and stored there. The user can therefore check later that no charges have actually been made for the time period $t_{VR}$. Within the charging center CHC or Billing Center of the service providers SP the billing address for registered communication costs, which were registered within the time period $t_{VR}$ for the mobile terminal MT, will be changed to the account of the host or railway operator.

FIG. 2a shows that a corresponding invoice <billHSC> is transmitted to a central host server HSC. The optional central host server HSC preferably manages the allocation, transfer and billing of the vouchers VR. The voucher VR issued by the host server HS can be transmitted to the central host server HSC. The central host server HSC then collects all vouchers VR and transmits them in an orderly manner, optionally signed with the private key, to the service provider SP, if appropriate to the charging center CHC of the mobile radio network PLMN.

To verify the delivered voucher VR, the central host server HSC preferably issues sequence numbers VRr, which the host server HS enters individually into the vouchers VR. The central host server HSC or the service provider SP, to which these sequence numbers VRr are also transmitted, can therefore check whether the vouchers VR are valid. The communication between the central host server HSC and the host server HS as well as the service provider SP can take place via any communication network, via mobile phone networks GSM/GSM-R or via the Internet.

After receipt of the voucher VR or the corresponding confirmation VR, the user of the mobile terminal MT can use the communication services of the communication network PLMN and establish data connections or voice connections to third parties DT, ST.

The corresponding charges TT are transferred from the switching center (G)MSC to the charging center CHC and transmitted by it with an invoice <charge SP> to the service provider SP or directly to the central host server HSC. In the charging center CHC or in the service provider SP the billing address is changed as described above. The service provider SP subsequently sends an invoice <bill HSC> to the central host server HSC.

FIG. 2b shows the procedure for the issuance of a voucher VR and for charging the communication costs for communication services used by a mobile terminal MT in the communication system shown in FIG. 2a.

Optionally, the central host server HSC will first transmit the sequence numbers VRr for the voucher VR to the host server HS and for verification to the service provider SP.

Subsequently, the mobile terminal MT is registered with the host server HS, e.g. according to the Bluetooth protocol or via the mobile radio network. Then data is transmitted from the mobile terminal MT to the host server HS, the identification data ID, which preferably include the IMSI, optionally the IMEI and the identification of the service provider used. Furthermore, authorizations such as the existence of an electronic ticket <eTicket> can be queried. Furthermore, location data can be transmitted or determined.

After verification of the data and permissions, a voucher VR is issued for a time period $t_{VR}$, preferably signed with the private PKI key, and transmitted to the service provider SP. The time period $t_{VR}$ is determined by the electronic ticket <eTicket>, which shows that the passenger is travelling from Zurich to Geneva. From a timetable or timetable computer FPR it is determined that the journey time is from 15:03 to 17:45 in the afternoon. The passenger can therefore access communication services free of charge during the travel time. The journey times can be checked e.g. by the host server HS or by the central host server HSC in order to adapt the voucher VR accordingly in case of a delay.

The communication costs are subsequently reported to the charging center by means of Toll Tickets <TT>, which in turn charges the communication costs to the service provider SP by means of an invoice <charge SP>, checks the charges and the voucher VR, which are preferably decoded by means of a public PKI key, and sends an invoice <bill HSC> to the host server HS, optionally to the central host server HSC.

The registration of the mobile terminals MT in the mobile radio network PLMN and the establishment and termination of the connections are carried out according to the protocols of the mobile radio network.

FIG. 3a shows the inventive communication system of FIG. 1 installed in a building HH, within which vouchers VR are transmitted from the host server HS to the mobile terminals MT and from there to the service provider SP or to the charging center CHC of the network operator. This transmission in turn takes place according to defined protocols. Preferably, the voucher VR is integrated into the messages exchanged during the registration of the mobile terminal MT with the mobile radio network PLMN or during the establishment of connections. In this case, the voucher VR are extracted from the messages of the mobile terminal MT on the network side and used. For this purpose, the architecture of the mobile radio network PLMN preferably has an application APP-CHC, which results in a change of the billing address in the charging center CHC. Alternatively, the voucher VR is transmitted from the mobile terminal MT to the service provider SP, in which an application APP-SP is implemented. In the mobile terminal MT, an application APP-C or APP-Cn is provided for each protocol stack, the protocol stack of the WLAN and the GSM protocol stack, which permits communication via the corresponding communication network WLAN, PLMN.

The GPRS protocol stack is shown in [5], page 308. The application APP-Cn would thus be implemented in the application layer of the mobile terminal and the application APP-C in an additional application layer of the SGSN.

The vouchers VR can also be transmitted from the mobile terminal MT to the service provider SP or the charging center CHC in another way. For example, they are transmitted by e-mail or by means of short messages.

FIG. 3a also shows that the host unit HE is intended to be installed in a building HH, e.g. an office building, a public building or an official building. The invention is therefore universally applicable to any mobile or stationary host unit HE. I.e., the embodiments of the communication systems shown in FIG. 2a, FIG. 3a and FIG. 4a can be used optionally in buildings, means of transportation or public places. The invention is particularly advantageous for use in mobile host units HE, where free WLAN access often offers insufficient quality or requires complex installations.

FIG. 3b shows the procedure for the issuance of a voucher VR and for charging the communication costs for communication services used by a mobile terminal MT in the communication system shown in FIG. 3a.

A WLAN or the mobile radio network is used to exchange data between the mobile terminals MT and the host server HS. The time period $t_{VR}$ for the voucher VR is selected according to the duration of the reservation of a hotel room, which can be read out from a computer RS e.g. at the reception of the hotel. After checking the identification data and authorizations, e.g. of a hotel reservation <eReceipt>, the voucher VR is created and transmitted to the mobile terminal MT and from there to the mobile radio network PLMN. The time period $t_{VR}$ is selected according to the reservation from 25.01.2018 to the 30.01.2018. The user can therefore use communication services of his service provider SP free of charge during the period of his reservation. The corresponding costs will be charged to the hotel operator.

The voucher VR is preferably signed with the private PKI key of the hotel. However, if the users are only temporary guests in the hotel, the location of the mobile terminals MT can be determined by means of the measures described below with reference to FIG. 4a. The example of FIG. 3a shows that location data does not have to be determined in every case, e.g. if the host server HS can determine an authorization in another way, e.g. based on the reservation in the hotel. In this case, however, the registration of the mobile terminal MT is advantageous, so that the voucher VR can be created taking into account the reservation and the registration of the mobile terminal MT.

In the embodiment of the communication systems of FIG. 3a the voucher VR will be sent to the network operator, optionally to the charging center CHC. The voucher VR will be extracted by the responsible instance (G)MSC or SGSN, in which the application APP-CHC is implemented. As a consequence, the billing address is already changed during the creation of the Toll Tickets <TT> or later at the charging center CHC. Preferably the IMSI-MT of the user is replaced by the IMSI-H of the host. The invoice <charge SP> with the changed billing address will be sent to the service provider SP or directly to the host server HS. As mentioned, the voucher VR can also be processed by the service provider SP.

The voucher VR can also be transmitted directly to the service provider SP from the host server HS of the Hotels as shown in FIG. 2a and FIG. 4a. The time period $t_{VR}$ can be determined by the reservation or by the time of presence of the user in the hotel by means of radio beacons, as described with reference to FIG. 4a.

FIG. 4a shows a particularly advantageous embodiment of the inventive communication system, which can be implemented with very little effort, e.g. in a building HH, a railway train TH or even on public land. In this case the host server HS communicates with the mobile terminals MT on the application layer of the installed applications APP-C and APP-H via the mobile radio network PLMN.

The host server HS can therefore be installed at any location, e.g. at the headquarters of the railway operator. It is further illustrated that the users can be visitors of a building HH or passengers in a train TH. It is described below that after installation of the applications APP-C the users are preferably registered with the host server HS. Subsequently, applications for the free use of communication services are sent to the host server HS via the APP-C applications. Again, the host server checks whether the users are entitled to receive free communication services. This can be done by proving an authorisation, e.g. of an electronic ticket or by proving the location of the mobile terminal MT in the service area of the host, i.e. in the building HH or in the railway train TH.

If the mobile terminals MT hold an electronic ticket or other authorisation, the determination of the location can be dispensed with. If no other authorization is present, the location of the mobile terminals MT is determined in the building HH or in the railway train TH. This can be done by determining and transmitting GPS data or by checking the transmitting and receiving station $BTS_{MT}$ to which the mobile terminals MT are registered. Particularly advantageous, i.e. simple and precise, the location of the mobile terminals MT can be determined by means of radio beacons HB installed by the host in its service area, e.g. in the building HH or in the railway train TH. The radio beacons, e.g. Bluetooth or WLAN radio beacons, broadcast continuously or periodically an identity or identifier BID which is captured by the mobile terminals MT and transmitted to the host server HS. The radio beacons HB are powered by a battery, for example, and can perform their service autonomously over a long period of time without maintenance. The radio beacons HB can be mounted on the ceiling or on a wall and are hardly visible. The retrofitting of a building or of a railway train can therefore be done with minimal effort and low costs.

The host server HS has access to a register where the identity BID of the radio beacons HB is recorded. The identity BID of the radio beacons is preferably chosen according to the vehicle number of the vehicle in which the radio beacons HB are installed. The mobile terminals MT will therefore transmit with the radio beacons-identity BID a vehicle identification which is already known to the host server or which it can determine from an inventory list of the rolling stock of the railway operator. The host server contacts e.g. regularly a server of the railway network, which manages the rolling stock of the railway network, and checks with the reported identity BID the radio beacons the existence and preferably the location of the corresponding railway car.

Particularly advantageous is the localisation via GPS-data. From the EP1862593A2, methods and devices are known, which allow determining the position of a railway car with an accuracy of 1 m. The routes travelled in a railway network can therefore be precisely determined online and/or stored in a database and retrieved again. The GPS-data transmitted by mobile terminals can therefore be correlated with currently recorded or registered GPS-data of the travel routes of the railway network to determine whether the mobile terminals MT have moved along such a route. Using current trip data or timetables, the correspondence between the displacement of the mobile terminals MT and of the railway train HT can also be checked. In this way it can be determined with minimal procedural effort and without hardware costs and with certainty whether the user is using the services of the host and is entitled to use the communication services free of charge.

Therefore, according to the invention, the mobile terminals MT transmit satellite data or GPS data to the host server HS once or preferably several times and that the host server HS compares these GPS data of the mobile terminals MT
a) with currently determined location data of the train, and/or
b) with registered location data of the railway network to determine whether users of the mobile terminals MT are on a railway train HT moving along a route of the railway network.

For example, it can be determined whether mobile terminals MT are moving practically in the local area and with an almost constant offset with a railway train HT, which is currently running on the railway network.

Even easier is the assignment to a currently used route, if the user enters the destination of his journey on his application APP-C and informs the host server HS accordingly. The starting point can then be determined by GPS data. Start and destination of the journey as well as the current time are thus known to the host server HS. In this way it can be verified that the user is not only travelling the route in question, but that he is also using the services of the host and not of a competitor. For example, if two rail operators X, Y offer transport from A to B at different times, the journey from A to B can be determined and the service provider X or Y can also be determined based on the time data of the journey and corresponding timetable data. According to the inventive method, the means of transport used by the user or the travel route and/or the service provider can be determined. The application APP-C of the mobile terminal MT, which continues to run in the background after the registration, can transmit GPS data according to a specified scheme or upon request of the host server HS, so that the determination of sufficient GPS data is guaranteed. If the location of the mobile terminals is stationary in the service area of a service provider for a certain time period, this can be determined precisely by means of GPS data. The free use of communication services can therefore be granted to MT mobile terminals for which the corresponding mobile or stationary location on the basis of GPS data and thus the corresponding authorisation has been verified.

By using GPS data the use of radio beacons can be avoided.

FIG. 4b shows the procedure for the issuance of a voucher VR and for charging the communication costs for communication services which can be used free of charge by a mobile terminal MT in the communication system shown in FIG. 4a during the period of stay.

With crosshatched arrows is illustrated that the mobile terminal MT and the host server HS communicate with each other via the mobile radio network PLMN. Via the mobile radio network PLMN the mobile terminal MT is registered with the host server HS. For this purpose preferably the IMSI, the IMEI and an identifier of the responsible service provider SP are transmitted.

In the building HH or the railway train TH of the host there are preferably numerous radio beacons HB installed, which cover the whole room and periodically send out signals with their identifiers BID. The mobile terminal MT receives this identifier BID or alternatively a GPS signal and transmits its identification data ID together with the identifiers BID the radio beacons and/or with GPS data to the host server HS.

The host server HS verifies the position of the mobile terminal MT on the basis of the transmitted identifiers BID of the radio beacons HB or by means of the GPS data preferably several times and generates a voucher VR for the time period $t_{VR}$ of the stay in a designated area, which voucher VR is transmitted to the service provider SP and in copy preferably to the mobile terminal MT. The time period $t_{VR}$ can again be determined according to one of the measures described above. E.g. the time period $t_{VR}$ ends after no identifiers BID of the radio beacons HB have been transmitted from the mobile terminal MT for a certain time, e.g. a few minutes. In addition, a pre-run and/or a post-run or a tolerance range can be provided.

It is illustrated that the registration of the mobile terminal MT with the transmission of the identifier BID takes place at 15:03 and the transmission of the identifier BID of the radio beacons HB ends at 17:45. In this example, the user travels from Zurich to Geneva at this time, as described in the example of FIG. 2a. The authorization of the user can therefore be made on the basis of the presence of the user in the train HT by processing the signals of the radio beacons HB, optionally taking into account the timetables or by checking the electronic tickets for the journey from Zurich to Geneva.

The installation of radio beacons HB, which are equipped with a battery, is particularly easy. Alternatively, the radio beacons HB can be connected to a power supply network, which can preferably be switched on or off. If the train is parked on a siding and not in use, the radio beacons HB are preferably switched off. However, if the radio beacons HB are not switched off, the host server HS can determine from the planning of the rolling stock that the corresponding railway train TH is not in service and the BID of its radio beacons HB does not indicate permission to receive free communication services. In other preferred embodiments, the radio beacons HB are preferably programmable via a wireless interface, so that BID identifiers can be changed optionally. It is also advantageous to use intelligent radio beacons HB, which are equipped with sensors and can transmit different BID codes depending on the presence of the sensor signals. E.g. radio beacons are put into a sleep mode if no optical or acoustic signals are perceived for a longer period of time. The presence of optical or acoustic signals is checked in intervals and the radio beacons are reset to active status. In this way it is possible to save energy and save the batteries.

The collected Toll Tickets TT, for communication services, which the user has used during his journey from Zurich to Geneva, are subsequently evaluated in the charging center CHC and, taking into account the voucher VR, charged to the service provider SP, which in turn charges the communication services used by the mobile terminal MT to the host server HS.

The invention claimed is:

1. A communication method for application in a railway system with at least one mobile terminal of a passenger travelling on a railway train, wherein the mobile terminal is configured to set up data connections or call connections via at least one mobile communication network to a data terminal or to a voice terminal and is configured for wireless communication with a host server of a host, the method comprising
- establishing a wireless communication link between the host server and the mobile terminal of the passenger traveling on the railway train, via which identification data are transferred from the mobile terminal to the host server;
- the host server creating a voucher, in which at least the identification data and a time period is registered;
- transmitting the voucher to an operator of the mobile communication network or to a service provider, which prepares statement of charges for the mobile terminal; and
- the operator of the mobile communication network or the service provider, based on the voucher, debiting communication costs for data connections or call connections of the mobile terminal that were registered during the time period indicated in the voucher, at least in part to an account assigned to an identifier of the host server; wherein
- radio beacons are installed in the railway train, which do not communicate bi-directionally with the mobile terminals but transmit a radio beacon-identification only, which is captured by the mobile terminal, and
- the mobile terminal transmits the radio beacon-identification to the host server, which uses the radio beacon-identification as location data and creates the voucher if the mobile terminal is positioned within a predetermined service area of the host.

2. The method according to claim 1, wherein
the host server is stationary or mobile,
a host-application is implemented in the host server, and
the host server and the mobile terminal, in which a client-application is implemented, communicate on an application layer of a WLAN, on a mobile radio network or by transmitting data via an optical interface.

3. The method according to claim 1, wherein
the identification data transmitted to the host server comprises
an identifier associated with the mobile terminal or the passenger, and/or
the location data and/or a host identifier, and/or
an identifier assigned to the service provider, and/or
a timestamp,
after verification or registration of which the voucher is created.

4. The method according to claim 1, wherein
the host server transmits a plurality of the vouchers individually or in batches to the operator of the mobile communication network or to the service provider, or
the voucher is transmitted from the host server to the mobile terminal and from the mobile terminal to the operator of the mobile communication network or to the service provider.

5. The method according to claim 1, wherein the host server issues the voucher after verification of presence of an authorization.

6. The method according to claim 5, wherein the presence of the authorization is presence of an electronic proof of purchase electronically stored in the mobile terminal.

7. The method according to claim 1, wherein the host server issues the voucher after repeated interrogation of the identification data and/or location data.

8. The method according to claim 1, wherein the host server defines the time period
according to a time period relating to a service provided; or
according to a time period between a login of the mobile terminal and a logoff of the mobile terminal; or
by taking into account presence times stored for the passenger holding the mobile terminal; or
according to a time period within which the position of the mobile terminal is located in a service area of the host.

9. The method according to claim 8, wherein
the time period relating to the service provided is a time period retrieved from an administrative computer, or
the time period between the login of the mobile terminal and the logoff of the mobile terminal is a time period between (i) login of the mobile terminal upon entering a room assigned to the host server and (ii) logoff of the mobile terminal upon leaving the room assigned to the host server.

10. The method according to claim 1, wherein
the passenger holding the mobile terminal downloads and implements a client-application on the mobile terminal and, after establishing a connection to a host-application of the host server, makes a first login at the host server with forwarding the identification data, and
the host server registers the passenger or the mobile terminal and issues vouchers for registered passengers or registered mobile terminals only.

11. The method according to claim 10, wherein the forwarded identification data is the identifier assigned to the mobile terminal or assigned to the passenger.

12. The method according to claim 1, wherein the service provider or the operator of the mobile communication network uses an application which allows extracting the voucher from messages received from the mobile terminal.

13. The method according to claim 12, wherein the service provider or the operator of the mobile communication network, after receiving the voucher, replaces an identity of a recipient of a bill for the communication costs for data connections or call connections of the mobile terminal, that were registered during the time period indicated in the voucher, with an identifier of a centralized host server or the identifier of the host server.

14. The method according to claim 13, wherein the identifier assigned to the passenger holding the mobile terminal is replaced with the identifier of the centralized host server or the identifier of the host server for the time period indicated in the voucher.

15. A communication system configured to execute the communication method according to claim 1.

16. The communication system according to claim 15, wherein
a host-application implemented in the host server is configured to
transmit the identification data via a client-application from the mobile terminal to the host server;
issue the voucher, in which at least the identification data and the time period are registered; and
transfer the issued voucher to the operator of the mobile communication network or to the service provider, which prepares the statement of charges for the mobile terminal; and
equipment of the operator of the mobile communication network or equipment of the service provider is configured to debit the costs based on the voucher for data connections or call connections of the mobile terminal, which were registered during the time period indicated in the voucher, at least in part to the account assigned to the identifier of the host server.

17. The communication system according to claim 15, wherein the radio beacons are WLAN beacons.

18. A railway system with the communication system according to claim 15 with at least the mobile terminal of the passenger travelling on the railway train.

19. The method according to claim 1, wherein each of the radio beacons are configured to only output the radio beacon-identification, and to not communicate bi-directionally with the mobile terminal.

* * * * *